United States Patent [19]
Sakashita

[11] Patent Number: 5,995,463
[45] Date of Patent: Nov. 30, 1999

[54] RECORDING/REPRODUCING APPARATUS

[75] Inventor: Mitsunori Sakashita, Miyagi-ken, Japan

[73] Assignee: Alps Electric Co., Ltd., Tokyo, Japan

[21] Appl. No.: 08/986,044

[22] Filed: Dec. 5, 1997

[30] Foreign Application Priority Data

Dec. 6, 1996 [JP] Japan .................................. 8-342737

[51] Int. Cl.⁶ .................. G11B 3/90; G11B 7/00
[52] U.S. Cl. ............................ 369/58; 369/44.28
[58] Field of Search ............. 369/44.25, 44.26, 369/44.27, 44.28, 44.29, 44.32, 44.35, 47, 50, 53, 54, 58

[56] References Cited

U.S. PATENT DOCUMENTS 4,748,610  5/1988  Nakata et al. .................. 369/44.25
5,161,141  11/1992  Sawata .............................. 369/58 X

FOREIGN PATENT DOCUMENTS

| 0 739 002 A1 | 10/1996 | European Pat. Off. . |
| 01-066878 | 3/1989 | Japan . |
| 4-195823 | 7/1992 | Japan . |
| 04364233 | 12/1992 | Japan . |

*Primary Examiner*—Paul W. Huber
*Attorney, Agent, or Firm*—Brinks Hofer Gilson & Lione

[57] ABSTRACT

A recording/reproducing apparatus comprises a disk (2) which is rotatably driven, a scratch detection circuit (6) for detecting a scratch in the disk (2) on the basis of a reproduced signal read from the disk (2) through a head (4), and a coarse movement stop control unit (14) for predicting the timing of a scratch which will appear next on the basis of the cycle of scratches detected by the scratch detection circuit (6) and stopping a coarse movement of the head (4) in a period from time immediately before at least the predicted timing to time at which the next appearing scratch passes.

4 Claims, 4 Drawing Sheets

RECORDING/REPRODUCING APPARATUS

BACKGROUND OF THE INVENTION

1. Field of the Invention

The present invention relates to a recording/reproducing apparatus such as an optical disk and, more particularly, to a recording/reproducing apparatus in which a track skip caused by scratches in a disk is suppressed.

2. Description of the Related Art

In a recording/reproducing apparatus such as an optical disk apparatus, when a scratch is in the disk, a process such as a process of holding a tracking servo operation to assure of the stability of the tracking servo operation is performed after the scratch is detected by an RF signal. A conventional recording/reproducing apparatus will be described below with reference to FIGS. 3 and 4 by using an optical disk apparatus as an example.

FIG. 3 is a block diagram showing a main part of the optical disk apparatus, and FIG. 4 is a timing chart for explaining operations in detection of a scratch. As shown in FIG. 3, in the optical disk apparatus, an optical disk (to be referred to as a disk hereinafter) 2 rotated by a spindle motor 1, an optical head (to be referred to as a head hereinafter) 4 for performing track tracing of an optical beam with movement of a lens 3 or the like with respect to the track of the disk 2, and a servo processor 5 for controlling the head 4 or the like according to a track error signal (TE signal) indicating a track position error of the head 4 or a reproduced RF signal are arranged. The servo processor 5 is constituted by a scratch detection circuit 6 serving as a scratch detection means for detecting a scratch in the disk on the basis of the RF signal, a tracking servo equalizer 7 for controlling the lens 3 and the head 4 on the basis of the tracking error signal, and a coarse movement supply servo equalizer 8. The tracking servo equalizer 7 outputs the track servo signal to an actuator driver 9 according to a tracking error signal TE, so that the actuator driver 9 controls the lens 3 or the like of the head 4.

Signals are recorded on a track spirally formed on the disk 2 from the inner periphery to the outer periphery, and an optical beam is irradiated on the track. A movable range of the optical beam irradiated on the disk 2 in the track direction is the range of about several tens tracks in only a tracking servo operation of the lens 3, and the entire surface of the disk 2 cannot be accessed. For this reason, the head 4 must be moved, and a coarse movement motor 10 serving as a moving means is used. As the coarse movement motor 10, a stepping motor is generally used. In movement between tracks whose range exceeds the limited range of tracking servo, a coarse movement control signal from the coarse movement supply servo equalizer 8 operating in response to a tracking error signal TE is output to the coarse movement motor driver 12 through a switching circuit 11. Although a reference voltage from a reference signal generation circuit 13 is also input to the switching circuit 11, a coarse movement control signal from the coarse movement supply servo equalizer 8 is generally input to a coarse movement motor driver 12 to rotatably drive the coarse movement motor 10, thereby moving the head 4.

When the disk 2 has a scratch such as a defect formed thereon, a reflected beam is offset from a spot (not shown) for detecting a tracking error, the tracking error signal TE cannot be detected, and a tracking servo operation is disabled, so that a track skip occurs. As a countermeasure against the track skip, a scratch detection signal from the scratch detection circuit 6 is input to the switching circuit 11. When the disk 2 has a scratch or the like formed thereon, a lack of a reproduced RF signal occurs. For this reason, the scratch or the like is detected by the scratch detection circuit 6, and a detected scratch detection signal switches the switching circuit 11, so that a reference voltage from the reference signal generation circuit 13 is input to the coarse movement motor driver 12 in place of a coarse control signal from the coarse movement supply servo equalizer 8. This operation is a coarse movement stop operation. In this manner, the stability of a tracking servo operation is realized.

The above operation will be described below with reference to FIG. 4. When the disk has a scratch, a notched portion D appears between t1 and t2 in a reproduced RF signal as shown in FIG. 4A. The scratch detection circuit 6 detects the scratch on the basis of the notched portion D, and, as shown in FIG. 4B, the scratch detection circuit 6 outputs a scratch detection signal S to the switching circuit 11 between t3 and t4 a predetermined period of time after t1. On the other hand, since a reflected beam from a spot for detecting a tracking error is eliminated due to the scratch, tracking servo acts to gradually increase the tracking error signal from t1 to t3 as shown in FIG. 4C. In this state, a light beam jumps over many tracks. For this reason, the switching circuit 11 is switched by a scratch detection signal S from the scratch detection circuit 6 to hold tracking servo between t3 and t4, and a reference voltage from the reference signal generation circuit 13 is input to the coarse movement motor driver 12 in place of a coarse control signal from the coarse movement supply servo equalizer 8. Since the coarse movement motor driver 12 has a reference voltage having the same value as that of the reference signal generation circuit 13, the coarse movement motor driver 12 does not output a rotatable drive power to the coarse movement motor 10. Therefore, drive rotation of the coarse movement motor 10 is stopped.

Although the coarse movement stop is effective between time t3 and time t4 between which the scratch detection circuit 6 detects a scratch to output a scratch detection signal S, the coarse movement stop is not effected in a period of time (from time t1 to time t3) until the detection of scratch and a period of time (from t4 to t2) after the detection of scratch. For this reason, the level of a tracking error signal is high. Therefore, the coarse movement supply servo equalizer 8 acts to generate relatively large vibrations Q1 and Q2 near t3 and t4. These vibrations are input to the coarse movement motor driver 12, and the coarse movement motor 10 is rotatably driven to move the head 4.

In the conventional recording/reproducing apparatus, with respect to a scratch in the disk, tracking servo is held after a defective signal is detected. However, since a coarse movement stop mechanism is interlocked with the tracking servo, a coarse movement stop operation is also performed after the scratch is detected. For this reason, vibration is generated when the head passes through the scratch, and the vibration is given to the head to easily cause a track skip (off track) to occur.

SUMMARY OF THE INVENTION

The present invention has an object that vibration of the head is eliminated such that rotatable drive of the coarse movement motor is stopped when the head passes through the scratch, thereby suppressing a track skip.

A recording/reproducing apparatus according to the present invention comprises: a disk which is rotatably driven; scratch detection means for detecting scratches in the disk on the basis of a reproduced signal read from the disk through a head; and a coarse movement stop control means for predicting a timing of a next appearing scratch on the basis of a cycle of scratches detected by the scratch detection means and stopping a coarse movement of the head a period from time immediately before at least the predicted timing to time at which the next appearing scratch passes.

In a recording/reproducing apparatus according to the present invention, the coarse movement stop control means predicts the timing of the next appearing scratch on the basis of a cycle of two continuous scratch detection signals output from the scratch detection means immediately before the next appearing scratch.

In a recording/reproducing apparatus according to the present invention, the coarse movement stop control means is designed to cancel coarse movement stop by a trailing edge of a pulse of a scratch detection signal generated by the scratch detection means.

In a recording/reproducing apparatus according to the present invention, the coarse stop control means comprises a scratch cycle prediction circuit for predicting the timing of the next appearing scratch, and a coarse movement stop signal generation circuit for generating a coarse movement stop signal for stopping a coarse movement of the head in the period from time immediately before at least the timing predicted by the scratch cycle prediction circuit to time when the next appearing scratch passes.

DESCRIPTION OF THE PREFERRED EMBODIMENT

Figure 1:
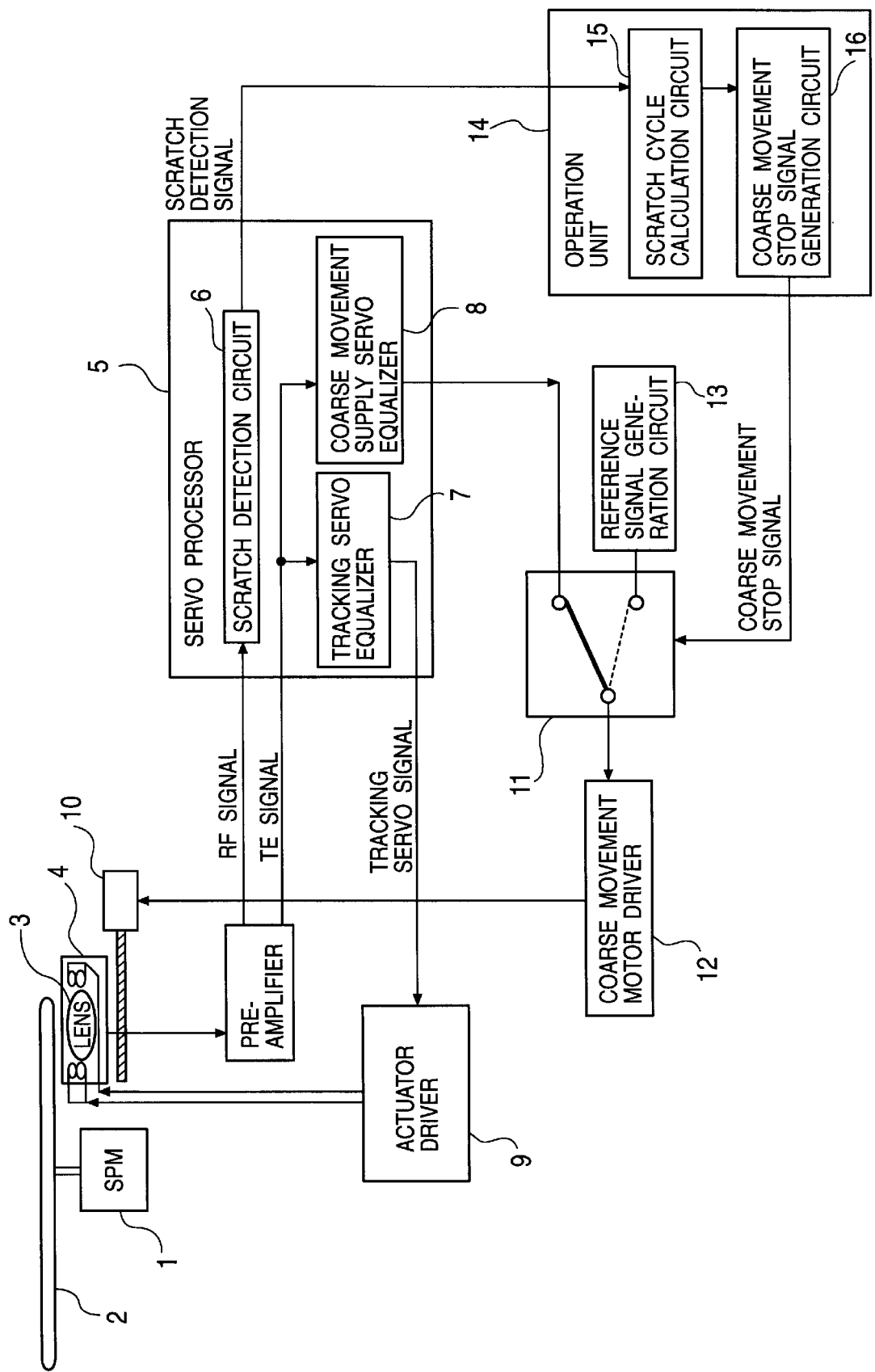
FIG. 1 is a block diagram showing the arrangement of a recording/reproducing apparatus according to the present invention.

An embodiment of a recording/reproducing apparatus according to the present invention will be described below with reference to the block diagram shown in FIG. 1 and the timing chart shown in FIG. 2. The same reference numerals as in FIG. 1 denote the same parts in the prior art, and a description thereof will be omitted.

Figure 2:
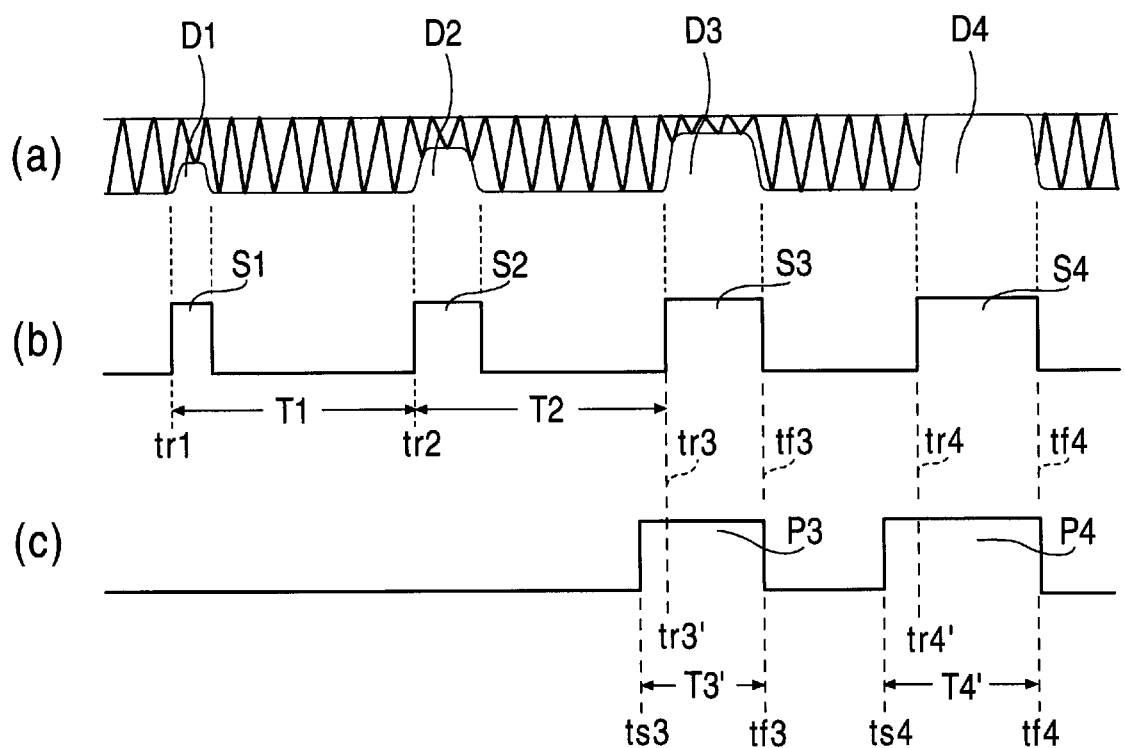
FIG. 2 is a timing chart for explaining the operations of the recording/reproducing apparatus according to the present invention.
Figure 3:
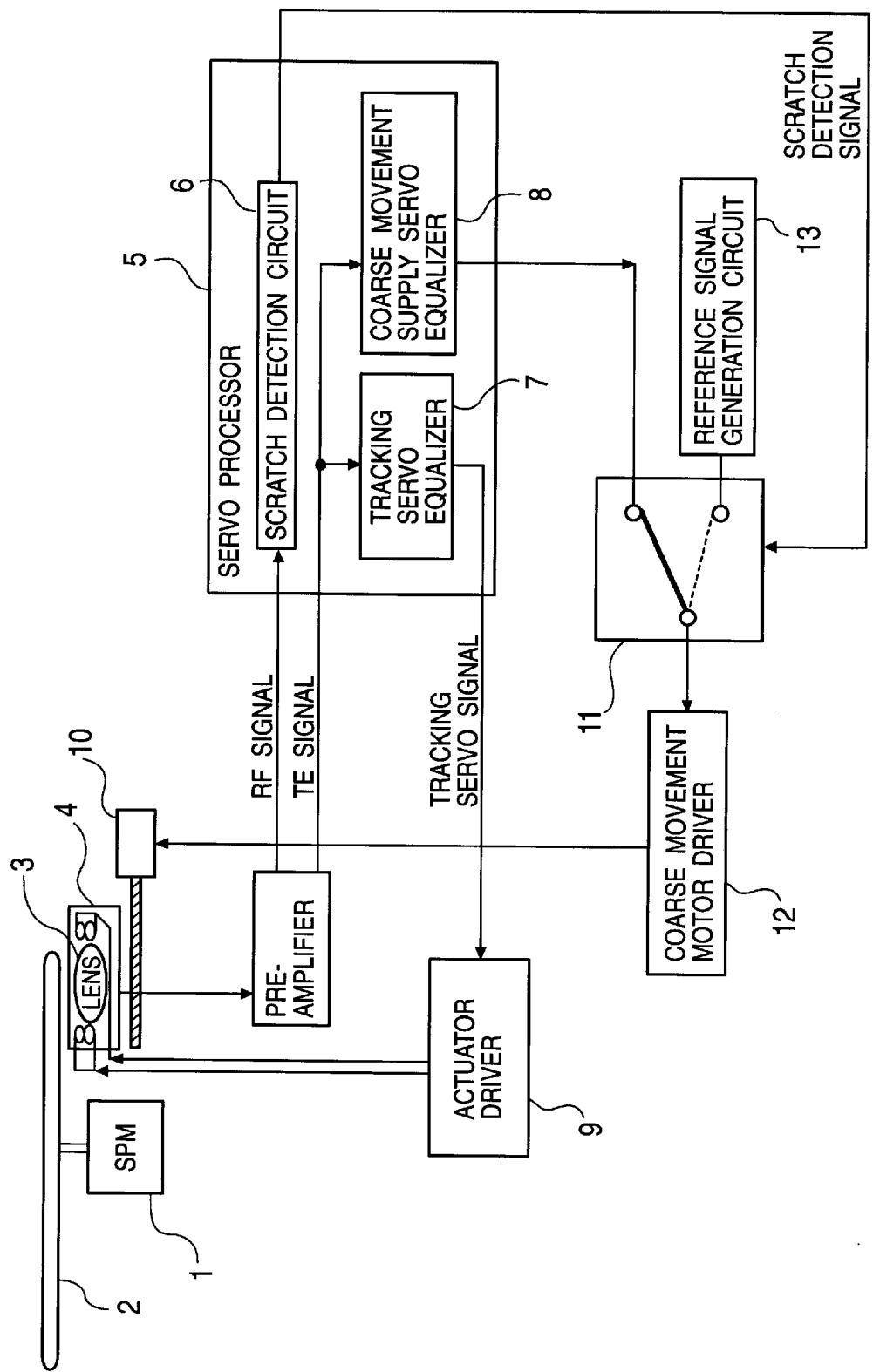
FIG. 3 is a block diagram showing the arrangement of a conventional recording/reproducing apparatus.
Figure 4:
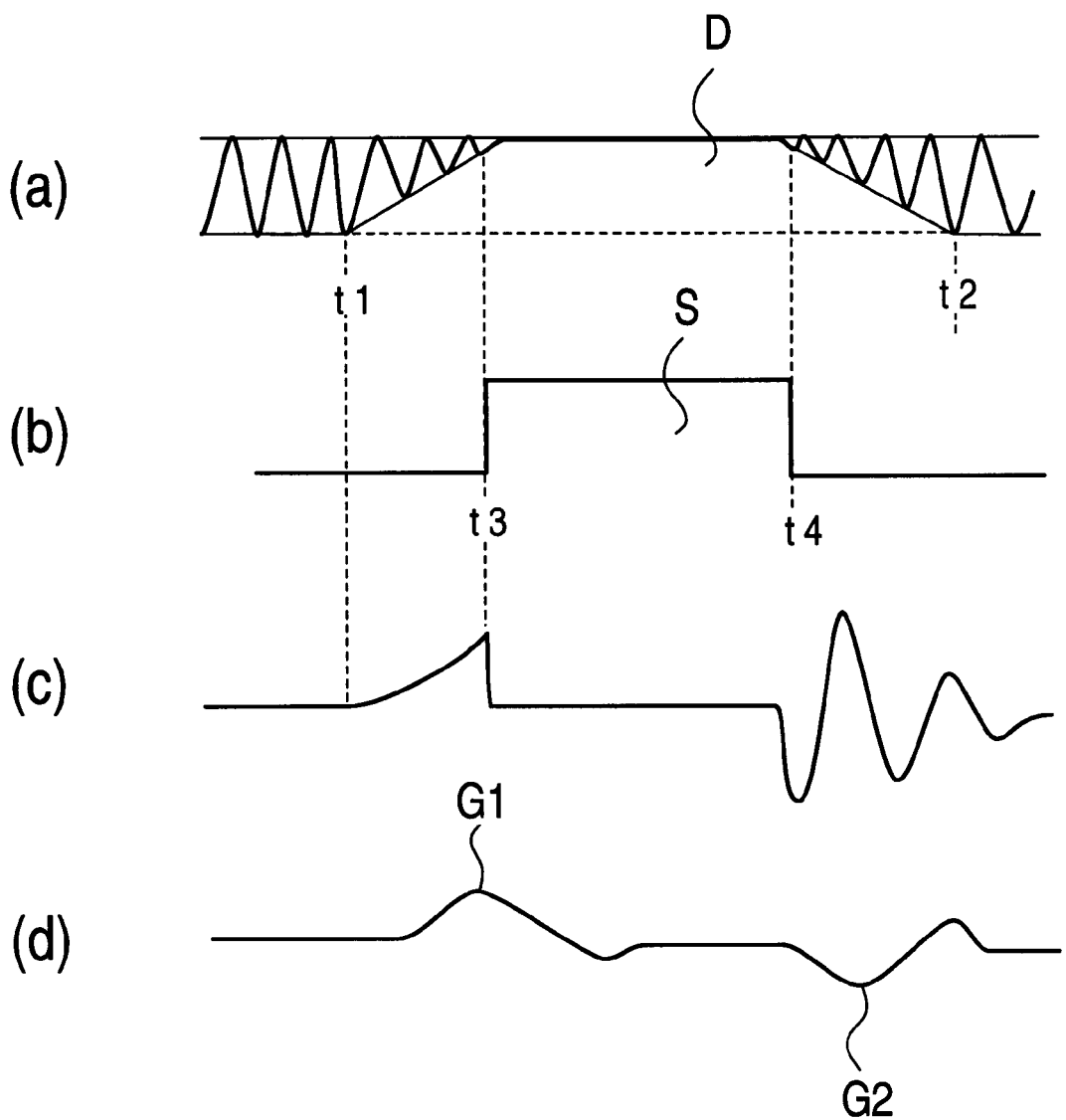
FIG. 4 is a timing chart for explaining the operations of the conventional recording/reproducing apparatus.

Referring to FIG. 1, a coarse control signal from a coarse movement supply servo equalizer 8 is also input to a switching circuit 11, and a reference voltage is input from a reference signal generation circuit 13 to the switching circuit 11. The switching circuit 11 is designed in the following manner. That is, in a normal state in which a disk has no scratch, the switching circuit 11 outputs the coarse movement control signal from the coarse movement supply servo equalizer 8 to a coarse movement motor driver 12 in response to a coarse movement stop signal from an arithmetic unit 14 serving as a coarse movement stop control means (to be described later). When a scratch is detected, the switching circuit 11 outputs a reference voltage from the reference signal generation circuit 13 to the coarse movement motor driver 12 while covering a period in which the scratch passes.

A scratch detection signal from a scratch detection circuit 6 is input to the arithmetic unit 14 comprising a scratch cycle calculation circuit 15 and a coarse movement stop signal generation circuit 16. When the arithmetic unit 14 receives the scratch detection signal from the scratch detection circuit 6, the arithmetic unit 14 causes the scratch cycle calculation circuit 15 to predict time at which the scratch appears again by rotation of the disk and to calculate the time. On the basis of the prediction, a coarse movement stop signal is output from the coarse movement stop signal generation circuit 16 to the switching circuit 11. The switching circuit 11 outputs a reference voltage from the reference signal generation circuit 13 to the coarse movement motor driver 12 on the basis of the coarse movement stop signal to stop the rotatable drive of a coarse movement motor 10. Detailed operations will be described below with reference to the timing chart in FIG. 2.

In the present invention, attentions are given to a scratch having the following nature. That is, in general, a scratch periodically appears by rotation of the disk 2. In addition, a scratch appearing in the first stage is relatively small, but the scratch gradually increases as a current track moves toward the outer periphery due to rotation of the disk 2. When the disk 2 has such a scratch, an RF signal reproduced from the disk 2 is given by the timing chart shown in FIG. 2A. More specifically, D1 denotes a notched portion of the RF signal generated by a scratch appearing first, and D2 denotes a notched portion of the RF signal generated by a scratch appearing second. Subsequently, notched portions D3, D4, . . . gradually increase in proportion to the size of the scratch, and indicate that the scratch periodically appears. The scratch detection circuit 6 detects a scratch by the notched portions D1, D2, D3, D4, . . . , and outputs scratch detection signals S1, S2, S3, S4, . . . , as shown in FIG. 2B, to the scratch cycle calculation circuit 15 of the arithmetic unit 14. The pulse widths of the scratch detection signals S1, S2, S3, S4, . . . are output in correspondence with the sizes (widths) of the notched portions D1, D2, D3, D4, . . . , i.e., the size of the scratch.

The scratch cycle calculation circuit 15 predicts time tr3' of a scratch which will appears next (third) on the basis of a time difference T1 between rise times tr1 and tr2 of two first continuous scratch detection signals S1 and S2. The scratch cycle calculation circuit 15 sends a start pulse to the coarse movement stop signal generation circuit 16 at time ts3 which is slightly earlier then the predicted time tr3'. The scratch cycle calculation circuit 15 sends a stop pulse to the coarse movement stop signal generation circuit 16 at the trailing edge (fall time tf3) of an actual third scratch detection signal S3. The coarse movement stop signal generation circuit 16 forms a pulse which rises in response to the start pulse from the scratch cycle calculation circuit 15 and falls in response to the stop pulse, i.e., a coarse movement stop signal P3 and sends the coarse movement stop signal P3 to the switching circuit 11.

The coarse movement stop signal P3 is designed such that, as shown in FIG. 2C, a period T3' from rise time ts3 to fall time tf3 covers the width of the notched portion D3 caused by the third scratch. Since the fall time tf3 is fall time tf3 of the scratch detection signal S3 itself, the period T3' necessarily covers the period in which the third scratch passes. The switching circuit 11 outputs a reference voltage from the reference signal generation circuit 13 to the coarse movement motor driver 12 in place of a coarse movement control signal from the coarse movement supply servo equalizer 8 in the period (T3') of the coarse movement stop signal P3, thereby stopping the rotation of the coarse movement motor 10. In addition, at fall time tf3 of the coarse movement stop signal P3, coarse movement stop is canceled, normal coarse movement control operates by rise time tr4 of the scratch detection signal S4 for the next (fourth) scratch, i.e., in an area in which the track has no scratch.

The scratch cycle calculation circuit 15 receives the subsequent scratch detection signal S3 from the scratch detection circuit 6, and the scratch cycle calculation circuit 15 predicts time tr4' of a scratch which will appear next (fourth) on the basis of a time difference T2 between rise time tr2 and rise time tr3 of the two continuous scratch detection signals S2 and S3. The scratch cycle calculation circuit 15 sends a start pulse to the coarse movement stop signal generation circuit 16 at time ts4 which is slightly earlier than the predicted time tr4'. The scratch cycle calculation circuit 15 sends a stop pulse to the coarse movement stop signal generation circuit 16 at the trailing edge (fall time tf4) of the fourth actual scratch detection signal S4. The coarse movement stop signal generation circuit 16 rises in response to the start pulse from the scratch cycle calculation circuit 15 to form a pulse which falls in response to the stop pulse, i.e., the coarse movement stop signal P4, and sends the coarse movement stop signal P4 to the switching circuit 11.

The coarse movement stop signal P4 is designed such that, as shown in FIG. 2C, a period T4' from rise time ts4 to the rise time tf4 covers the width of the notched portion D4 caused by the fourth scratch. The switching circuit 11 outputs a reference voltage from the reference signal generation circuit 13 to the coarse movement motor driver 12 in place of a coarse movement control signal from the coarse movement supply servo equalizer 8 in the period (T3') of the coarse movement stop signal P4, thereby stopping the rotation of the coarse movement motor 10.

Subsequently, as in the above-mentioned case, a coarse movement stop signal Pn for the nth scratch is formed on the basis of rise times of a scratch detection signal S(n−1) for the (n−1)th scratch and a scratch detection signal S(n−1) for the (n−2)th scratch and fall time of a scratch detection signal Sn for the nth scratch. The coarse movement stop signal is always formed by an updated scratch detection signal. As described above, since no coarse movement stop signal is output in a period between the fall time tf3 of the third scratch detection signal P3 and rise time tr4 of the fourth scratch detection signal P4, i.e., in a period in which the scratch has no track, coarse movement stop is canceled, the coarse movement motor 10 is rotatably driven by a normal coarse movement, and reproduction for the disk is performed without any problem. With respect to the subsequent scratches, the same operations as described above are performed.

As has been described above, in a recording/reproducing apparatus according to the present invention, the timing of a scratch which will appear next is predicted on the basis of the cycle of scratches detected by a scratch detection means, and the coarse movement of a head is stopped by a coarse movement stop means in a period from time immediately before at least the predicted timing to time at which the next appearing scratch passes. For this reason, the head can be free from vibration even if the scratch is passing, and a track skip can be prevented.

In the recording/reproducing apparatus according to the present invention, the coarse movement stop control means predicts the timing of a scratch which will appear next on the basis of the cycle of two continuous scratch detection signals output from the scratch detection means immediately before the next appearing scratch. For this reason, the predicted appearing timing of the scratch can be made almost equal to the actual appearing timing of the scratch with the continuity of the scratch. As a result, a coarse movement can be stopped at a correct timing.

In the recording/reproducing apparatus according to the present invention, since the coarse movement stop control means cancels coarse movement stop by the trailing edge of a pulse of a scratch detection signal generated by the scratch detection means, a coarse movement can be necessarily stopped in an area in which a scratch passes, and a normal coarse movement operation is performed in an area in which the track has no scratch. Therefore, reproduction for the disk can be continued without an interruption.

In the recording/reproducing apparatus according to the present invention, since the coarse movement stop control means comprises a scratch cycle prediction circuit and a coarse movement stop signal generation circuit, a coarse movement stop signal can be easily formed from a scratch detection signal from a scratch detection circuit. When only the arithmetic unit 14 is added to a conventional recording/reproducing apparatus, the recording/reproducing apparatus can have a function of stopping a coarse movement while covering a period in which a scratch passes.

What is claimed is:

1. A recording/reproducing apparatus characterized by comprising: a disk which is rotatably driven; scratch detection means for detecting scratches in said disk on the basis of a reproduced signal read from said disk through a head; and a coarse movement stop control means for predicting a timing of a next appearing scratch on the basis of a cycle of scratches detected by said scratch detection means and stopping a coarse movement of said head in a period from time immediately before at least the predicted timing to time at which the next appearing scratch passes.

2. A recording/reproducing apparatus according to claim 1, characterized in that said coarse movement stop control means predicts the timing of the next appearing scratch on the basis of a cycle of two continuous scratch detection signals output from said scratch detection means immediately before the next appearing scratch.

3. A recording/reproducing apparatus according to claim 1, characterized in that said coarse movement stop control means is designed to cancel coarse movement stop by a trailing edge of a pulse of a scratch detection signal generated by said scratch detection means.

4. A recording/reproducing apparatus according to claim 1, characterized in that said coarse stop control means comprises a scratch cycle prediction circuit for predicting the timing of the next appearing scratch, and a coarse movement stop signal generation circuit for generating a coarse movement stop signal for stopping a coarse movement of said head in the period from time immediately before at least the timing predicted by said scratch cycle prediction circuit to time when the next appearing scratch passes.

\* \* \* \* \*